(12) United States Patent
MolavianJazi et al.

(10) Patent No.: US 10,887,843 B2
(45) Date of Patent: Jan. 5, 2021

(54) METHOD AND APPARATUS FOR TRANSMITTING AN UPLINK TRANSMISSION BASED ON A PATHLOSS ESTIMATE

(71) Applicant: Lenovo (Singapore) Pte. Ltd., New Tech Park (SG)

(72) Inventors: Ebrahim MolavianJazi, Lincolnwood, IL (US); Hyejung Jung, Northbrook, IL (US); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 16/408,436

(22) Filed: May 9, 2019

(65) Prior Publication Data

US 2019/0349867 A1 Nov. 14, 2019

Related U.S. Application Data

(60) Provisional application No. 62/670,708, filed on May 11, 2018.

(51) Int. Cl.
*H04W 52/24* (2009.01)
*H04W 52/14* (2009.01)
(Continued)

(52) U.S. Cl.
CPC ........ *H04W 52/242* (2013.01); *H04B 17/309* (2015.01); *H04L 5/0048* (2013.01); *H04W 48/16* (2013.01); *H04W 52/146* (2013.01)

(58) Field of Classification Search
CPC . H04W 48/16; H04W 52/146; H04W 52/242; H04B 17/309; H04L 5/0048
(Continued)

(56) References Cited

U.S. PATENT DOCUMENTS

| 10,361,831 B2* | 7/2019 | Froberg Olsson .... H04L 5/0053 |
| 2005/0090278 A1* | 4/2005 | Jeong ................ H04W 36/0055 455/525 |

(Continued)

FOREIGN PATENT DOCUMENTS

| EP | 2763471 A1 | 8/2014 |
| WO | 2012149661 A1 | 11/2012 |

OTHER PUBLICATIONS

3GPP TS 36.331 V15.1.0 3rd Generation Partnership Project; Technical Specification Group Radio Access Network; Evolved Universal Terrestrial Radio Access (E-UTRA); Radio Resource Control (RRC); Protocol specification (Release 15) (Mar. 2018).
(Continued)

*Primary Examiner* — Tan H Trinh
(74) *Attorney, Agent, or Firm* — Loppnow & Chapa; Matthew C. Loppnow

(57) ABSTRACT

Configuration information can be received in a first serving cell. A determination can be made as to whether the configuration information includes a cell ID. A pathloss estimate for an uplink transmission transmit power setting can be determined based on a pathloss reference signal associated with a second serving cell if the configuration information includes the cell ID. The uplink transmission can be transmitted on the first serving cell based on the determined pathloss estimate.

21 Claims, 3 Drawing Sheets

(51) Int. Cl.
*H04W 48/16* (2009.01)
*H04B 17/309* (2015.01)
*H04L 5/00* (2006.01)

(58) Field of Classification Search
USPC ......... 455/522, 515; 370/252, 311, 329, 336
See application file for complete search history.

(56) References Cited

U.S. PATENT DOCUMENTS

| | | | | |
|---|---|---|---|---|
| 2012/0170533 | A1* | 7/2012 | Ahn | H04B 7/0689 370/329 |
| 2012/0282964 | A1* | 11/2012 | Xiao | H04L 5/0053 455/515 |
| 2013/0182583 | A1* | 7/2013 | Siomina | H04W 24/10 370/252 |
| 2013/0258882 | A1 | 10/2013 | Dinan | |
| 2014/0050206 | A1* | 2/2014 | Seo | H04J 11/0069 370/336 |
| 2014/0056251 | A1* | 2/2014 | Ahn | H04W 52/146 370/329 |
| 2014/0094216 | A1* | 4/2014 | Park | H04W 52/242 455/522 |
| 2014/0113677 | A1* | 4/2014 | Parkvall | H04W 52/242 455/522 |
| 2014/0161060 | A1* | 6/2014 | Nam | H04L 1/1864 370/329 |
| 2014/0286219 | A1* | 9/2014 | Siomina | H04J 11/0023 370/311 |
| 2014/0295909 | A1* | 10/2014 | Ouchi | H04W 52/40 455/522 |
| 2015/0063317 | A1* | 3/2015 | Park | H04W 56/0005 370/336 |
| 2015/0223181 | A1* | 8/2015 | Noh | H04L 25/0226 370/329 |
| 2015/0319718 | A1* | 11/2015 | Yang | H04W 76/15 370/252 |
| 2017/0318473 | A1* | 11/2017 | Futaki | H04W 48/16 |
| 2017/0347270 | A1* | 11/2017 | Iouchi | H04W 16/14 |
| 2018/0014257 | A1* | 1/2018 | Ouchi | H04W 52/242 |
| 2018/0270784 | A1* | 9/2018 | Lee | H04J 11/00 |
| 2019/0335400 | A1* | 10/2019 | Gong | H04W 52/146 |
| 2019/0349983 | A1* | 11/2019 | Loehr | H04W 52/242 |

OTHER PUBLICATIONS

3GPP TS 38.213 V15.1.0 3rd Generation Partnership Project; Technical Specification Group Radio Access Network; NR; Physical layer procedures for control (Release 15) (Mar. 2018).

3GPP TS 38.331 V15.1.0, 3rd Generation Partnership Project; Technical Specification Group Radio Access Network; NR; Radio Resource Control (RRC) protocol specification (Release 15) (Mar. 2018).

3GPP RAN1 Chairman's Notes, 3GPP TSG RAN WG1 Meeting #92bis, Sanya, China, Apr. 16-20, 2018.

3GPP RAN1, LS on UL cross carrier beam indication, R1-1805627, 3GPP TSG RAN WG1 Meeting #92bis, Sanya, china, Apr. 16-20, 2018.

Samsung, [Draft] LS on UL cross carrier beam indication, R1-1805739, 3GPP TSG RAN WG1 Meeting #92bis, Sanya, China, Apr. 16-20, 2018.

3GPP TS 36.213 V15.1.0 3rd Generation Partnership Project; Technical Specification Group Radio Access Network; Evolved Universal Terrestrial Radio Access (E-UTRA); Physical layer procedures (Release 15) (Mar. 2018).

Lopez, PCT International Search Report, International Application No. PCT/IB2019/053906, European Patent Office, Rijswijk, NL, dated Oct. 25, 2019.

* cited by examiner

METHOD AND APPARATUS FOR TRANSMITTING AN UPLINK TRANSMISSION BASED ON A PATHLOSS ESTIMATE

BACKGROUND

1. Field

The present disclosure is directed to a method and apparatus for transmitting an uplink transmission based on a pathloss estimate. More particularly, the present disclosure is directed to transmitting an uplink transmission on a serving cell based on a determined pathloss estimate.

2. Introduction

Presently, wireless communication devices, such as user equipment, communicate with other communication devices using wireless signals. In carrier-aggregation operation in Long Term Evolution (LTE) systems, a cross-carrier indication of pathloss reference is used to indicate that a Downlink (DL) pathloss reference for Uplink (UL) transmission on a secondary cell can be the DL pathloss reference of a primary cell, such as a Primary Cell (PCell) or Primary Secondary Cell (PSCell), for which a higher-layer filtered Reference Signal Received Power (RSRP) can be estimated more accurately and/or more frequently. In LTE, a User Equipment (UE) relies on omni-directional transmission, such as single beam operation, so the UE is configured with only one DL pathloss reference for each serving cell.

In Fifth-Generation New Radio (5G NR), however, each UE can be configured with multiple downlink and multiple uplink spatial relations, such as multi-beam operation, for downlink reception and uplink transmission, respectively. Accordingly, semi-static mappings are configured between Physical Uplink Shared Channel (PUSCH)/Physical Uplink Control Channel (PUCCH) beam indications and power control parameters.

The concept of cross-carrier beam indication has been introduced very recently for 5G NR to reduce the signaling overhead needed for DL/UL spatial relation configuration and to enrich the set of beam indications available for a serving cell using the DL or UL beams/spatial relations configured in other serving cells.

However, cross-carrier indication for uplink power control parameters, even based on the simple LTE-like solution, has not been discussed for 5G NR yet. Even for the case of Carrier Aggregation (CA) operation, the existing power control configurations consider PUSCH/PUCCH beam indications only within the same Bandwidth Part (BWP) and current serving cells. How to define and use cross-carrier indication for power control parameters is not defined in current Third-Generation Partnership Project (3GPP) Radio Access Network (RAN)1 specifications for power control, and there is need for solutions and interpretations of power control parameters to use with cross-carrier beam indication.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

At least some embodiments can provide a method and apparatus for communicating on a wireless network. At least some embodiments can also provide for uplink power control with carrier aggregation and multi-beam operation. At least some embodiments can further provide for transmitting an uplink transmission on a serving cell based on the determined pathloss estimate. According to a possible embodiment, configuration information can be received in a first serving cell. A determination can be made as to whether the configuration information includes a cell Identifier (ID). A pathloss estimate for a UL transmission transmit power setting can be determined based on a pathloss RS associated with a second serving cell if the configuration information includes the cell ID. The UL transmission can be transmitted on the first serving cell based on the determined pathloss estimate.

Figure 1:
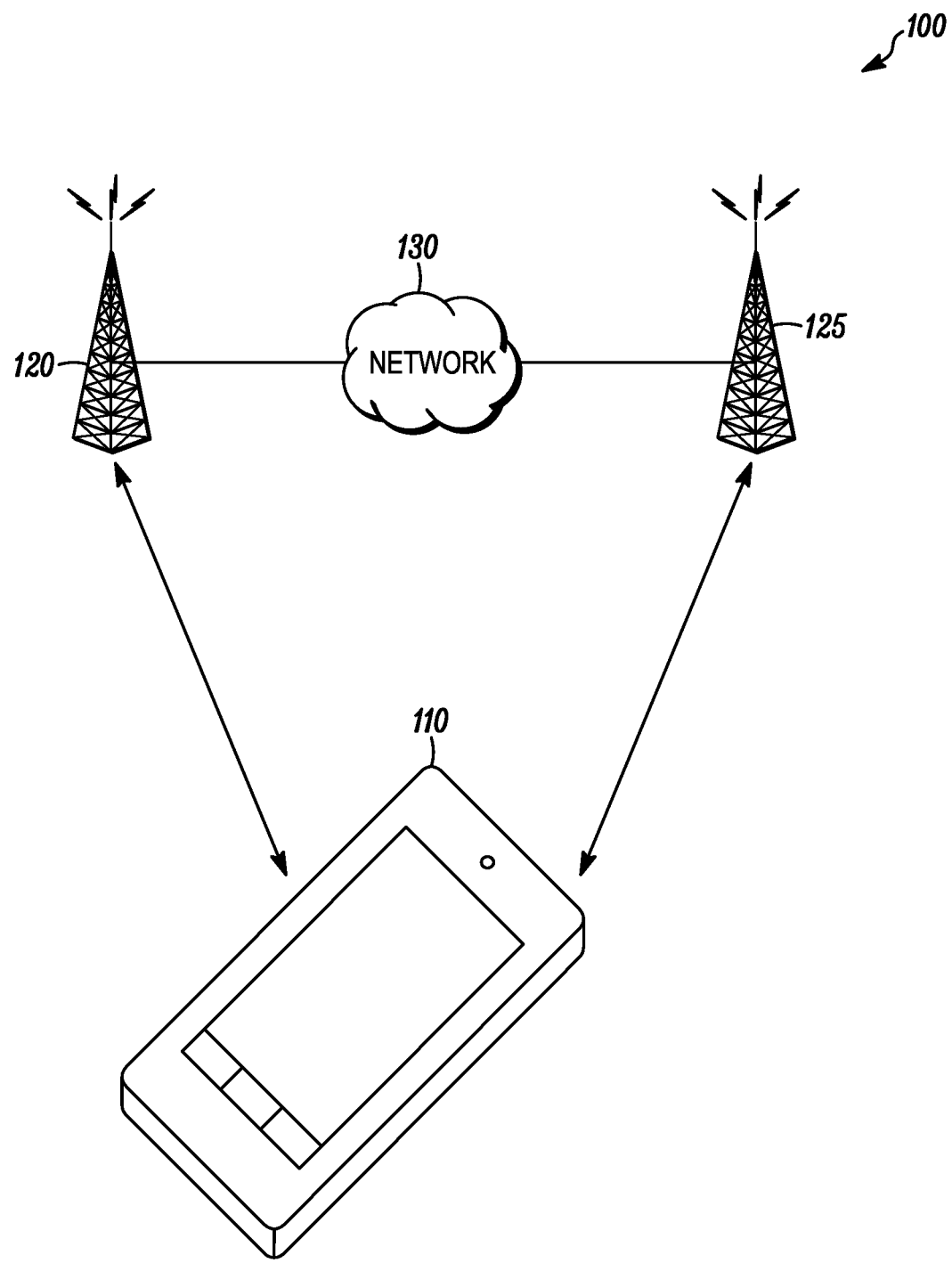
FIG. 1 is an example block diagram of a system according to a possible embodiment.

FIG. 1 is an example block diagram of a system 100 according to a possible embodiment. The system 100 can include a UE 110, at least one network entity 120 and 125, such as a base station, and a network 130. The UE 110 can be a wireless wide area network device, a user device, wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The at least one network entity 120 and 125 can be a wireless wide area network base station, can be a NodeB, can be an enhanced NodeB (eNB), can be a New Radio NodeB (gNB), such as a 5G NodeB, can be an unlicensed network base station, can be an access point, can be a base station controller, can be a network controller, can be a Transmission/Reception Point (TRP), can be a different type of network entity from each other, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3GPP-based network, a satellite communications network, a high altitude platform network, the Internet, and/or other communications networks.

In operation, the UE 110 can communicate with the network 130 via at least one network entity 120. For example, the UE can send and receive control signals on a control channel and user data signals on a data channel.

When introduced, cross-carrier indication for power control parameters can reduce signaling overhead, such as transmissions by a network and measurements at a UE, for power control parameter configurations within a serving cell and also can provide power control support for an enriched set of beam indications from other serving cells that are already enabled via cross-carrier beam indication. In addition, UE complexity for maintaining many pathloss estimates for all serving cells can be reduced and the set of maintained pathloss estimates can be based on Downlink Reference Signal (DLRS) resources from those serving cells that can be more accurately and/or more frequently measured by the UE.

At least one possible embodiment of the disclosed embodiments can provide solutions for cross-carrier indication for uplink power control parameters for grant-based and grant-free PUSCH, PUCCH, and Sounding Reference Signal (SRS) transmissions. Also, at least one possible embodiment of the disclosed embodiments can provide uplink power control for PUSCH based on semi-persistent SRS with and without cross-carrier indication of power control parameters.

In LTE, the antenna port 0 of Cell-specific Reference Signals (CRS) is typically always used for Pathloss (pathloss) measurement. Thus, a UE-specific Radio Resource Control RRC signaling to configure a Secondary Cell (SCell) for a UE indicates via parameter 'pathlossReferenceLinking' to the UE whether uplink transmissions in the SCell are based on a pathloss measurement from a primary cell, such as a PCell or PSCell, or the SCell itself.

However, in NR, each cell has one or more pathloss reference resources each of which can be a different type of Reference Signal (RS), such as a Synchronization Signal (SS), a Physical Broadcast Channel (PBCH) block, or a Channel State Information Reference Signal (CSI-RS). Also, each cell may potentially be associated with a different serving cell. Hence, the existing LTE-like pathloss linkage signaling, such as 'pathlossReferenceLinking', that selects either PCell/PSCell or SCell as the pathloss reference may not be enough to support flexible multi-beam operation with lower reference signal overhead. Even the LTE-like pathloss linking is not captured in the current 3GPP RAN1 specification for UL power control in Technical Specification (TS) 38.213 v15.1.0.

In a similar context, in the current 5G NR specification, other power control parameters including open-loop parameters, such as the UE-specific component of the target spectral density, Po_UE, and the fractional pathloss compensation factor, alpha, and the closed-loop power control process cannot be linked to the PUSCH/PUCCH beam indication and therefore, the corresponding open-loop and closed-loop settings corresponding to other serving cells. Similar considerations hold for SRS power control, as well.

Typically, in carrier-aggregation operation in LTE, there is the concept of cross-carrier pathloss reference indication, where the DL pathloss reference for transmission on an UL carrier of a secondary cell can be indicated to be the DL pathloss for a primary cell, such as a PCell or PSCell, or indicated to be the DL pathloss for the secondary cell itself, such as on the DL carrier linked to the UL carrier on the secondary cell. The corresponding text from TS 36.213 is as follows. Note that in LTE, a UE is configured with only one DL pathloss reference for each serving cell.

$PL_c$ is the downlink path loss estimate calculated in the UE for serving cell c in dB and $PL_c$=referenceSignalPower−higher layer filtered RSRP, where referenceSignalPower is provided by higher layers and RSRP is defined in [TS 36.213 v15.1.0] [5] for the reference serving cell and the higher layer filter configuration is defined in [TS 36.213 v15.1.0] [11] for the reference serving cell.

If serving cell c belongs to a [Timing Advance Group] TAG containing the primary cell then, for the uplink of the primary cell, the primary cell is used as the reference serving cell for determining referenceSignalPower and higher layer filtered RSRP. For the uplink of the secondary cell, the serving cell configured by the higher layer parameter pathlossReferenceLinking defined in [TS 36.213 v15.1.0] [11] is used as the reference serving cell for determining referenceSignalPower and higher layer filtered RSRP.

If serving cell c belongs to a TAG containing the PSCell then, for the uplink of the PSCell, the PSCell is used as the reference serving cell for determining referenceSignalPower and higher layer filtered RSRP; for the uplink of the secondary cell other than PSCell, the serving cell configured by the higher layer parameter pathlossReferenceLinking defined in [TS 36.213 v15.1.0] [11] is used as the reference serving cell for determining referenceSignalPower and higher layer filtered RSRP.

If serving cell c belongs to a TAG not containing the primary cell or PSCell then serving cell c is used as the reference serving cell for determining referenceSignalPower and higher layer filtered RSRP.

The RRC information element, pathlossReferenceLinking, sent to a UE in LTE spec TS 36.331 v15.1.0 [2] is as follows.

```
UplinkPowerControlDedicatedSCell-r10 ::=    SEQUENCE {
    p0-UE-PUSCH-r10                             INTEGER (-8..7),
    deltaMCS-Enabled-r10                        ENUMERATED
{en0, en1},
    accumulationEnabled-r10                     BOOLEAN,
    pSRS-Offset-r10                             INTEGER (0..15),
    pSRS-OffsetAp-r10                           INTEGER (0..15)
                        OPTIONAL,   -- Need OR
    filterCoefficient-r10                       FilterCoefficient
        DEFAULT fc4,
    pathlossReferenceLinking-r10                ENUMERATED {pCell, sCell}
}
pathlossReferenceLinking
Indicates whether the UE shall apply as pathloss reference either the downlink of the
PCell or of the SCell that corresponds with this uplink (i.e. according to the
cellIdentification within the field sCellToAddMod). For SCells part of an STAG E-
UTRAN sets the value to sCell.
```

Typically, in 5G NR, each UE can be configured with multiple downlink and multiple uplink spatial relations, such as beams, for downlink reception and uplink transmission, respectively. The following 3GPP RAN1 agreement clarifies how cross-carrier beam indication is enabled.

Support uplink cross-carrier beam indication for PUCCH and SRS

Add Cell index and BWP information in SpatialRelation configuration

This is endorsed with the following additional sentences:

Based on the above agreements, RAN1 would like to kindly ask to add the below RRC parameters in PUCCH-SpatialRelationInfo and spatialRelationInfo.

| RRC parameter | Value range | Description |
|---|---|---|
| Cell | (0 ... maxNrofServingCells−1) | ServCellIndex |
| bwp-Id | (0 ... maxNrofBWPs) | BWP-Id |

As per the above agreements, RAN1 has agreed on cross carrier indication of spatial relations with SRS and PUCCH. For the case of SRS, changes are needed to the MAC CE message used for activating semi-persistent SRS to enable cross carrier indication. RAN1 suggests that RAN2 take this into their work.

Cross-carrier beam indication in New Radio-Carrier Aggregation (NR-CA) operation can be useful for enriching the set of beam indications available for a serving cell based on the DL or UL beams/spatial relations configured in other serving cells. Alternatively, cross-carrier beam indication can be considered a means to reduce the signaling overhead needed for spatial relation configuration for a serving cell, since some of the spatial relations are not configured in the serving cell, but instead in other serving cells.

Typically, in 5G NR, for uplink transmissions PUSCH/PUCCH, a UE can be configured with UL power control parameters, including the DL pathloss references, the open-loop parameters Po and alpha, and the closed-loop processes, that are configured per BWP per serving cell via semi-static mappings, which can be configured between PUSCH/PUCCH beam indications and the power control parameters.

In particular, PUSCH beam indication can be based on an SRS Resource Indicator (SRI) in the uplink DCI. Therefore, for PUSCH power control, a UE can be configured with semi-static RRC mappings between the set of SRIs and the set of power control parameters (open-loop index T, the DL pathloss reference index 'q_d', and the closed-loop index 'l'). Accordingly, for grant-based PUSCH scheduled by DCI format 0_1 that includes an SRI field in the uplink grant, the indicated SRI indicates the power control parameters (j, q_d, l) to use based on the aforementioned mapping. Also, for PUSCH power control, for grant-free/configured-grant Type-2 PUSCH transmission whose activation UL DCI includes an SRI field, the indicated SRI indicates the DL pathloss reference index 'q_d' to use based on the aforementioned mapping. Also, for PUSCH power control, for grant-based PUSCH transmission that can be scheduled by a DCI format 0_1 without SRI, or scheduled by DCI format 0_0, the first configured PUSCH power control parameters, such as, j=2, q_d=0, and l=0, are used. Also, for PUSCH power control, for grant-free/configured-grant Type-2 PUSCH transmission whose activation uplink DCI does not contain an SRI field, the first configured PUSCH DL pathloss reference index 'q_d=0' can be used. Also, for PUSCH power control, for grant-free/configured-grant Type-1 PUSCH transmission, all power control parameters, including the DL pathloss reference index, are semi-statically configured in RRC.

Similarly, PUCCH beam indication can be based on the semi-statically configured parameter PUCCH-Spatial-RelationInfo. Therefore, for PUCCH power control, a UE, for each PUCCH resource, can be configured with semi-static RRC mappings between the PUCCH-SpatialRelationInfo value(s) and the set of power control parameters, such as open-loop index 'q_u', the DL pathloss reference index 'q_d', and the closed-loop index 'l'. Indeed, the parameter PUCCH-SpatialRelationInfo can include the power control parameter indices (q_u, q_d, l). If PUCCH-SpatialRelationInfo is configured with more than one value, a Medium Access Control-Control Element (MAC-CE) command can activate one of the configured spatial relations and the corresponding power control parameter indices. Also, for PUCCH, if the UE is configured with parameter PUCCH-Spatial-RelationInfo with multiple values, but MAC-CE has not activated any of them, then a pre-defined spatial direction and its corresponding power control parameters can be used as default values. Also, for PUCCH, if the UE can be not configured with semi-statically configured parameter PUCCH-Spatial-RelationInfo, the first configured PUCCH power control parameters, such as q_u=0, q_d=0, and l=0, can be used as default values.

In 5G NR, a UE can be configured with up to 4 DL pathloss references for each serving cell. For CA operation and/or Cooperative Multi-Point (CoMP) transmission/reception in NR, reuse of pathloss reference signals across carriers, such as aggregated cells, can reduce reference signal overhead especially for multi-beam operation requiring a large number of reference signal resources. In one example, SS/PBCH Blocks (SSBs) are only transmitted on a first BWP of a first carrier/cell and PUCCH and/or SRS is/are transmitted on a second BWP of a second carrier/cell using the SSB on the first BWP of the first carrier/cell as spatial relation for transmitting the signal/channel on the second BWP of the second carrier/cell with the same spatial domain transmission filter used for the reception of the SSB on the first BWP of the first carrier/cell. Such a cross-carrier beam/power control parameter indication can be used, for example, in the case of collocated, intra-band, such as contiguous, carrier aggregation. In order to enable cross-carrier pathloss references indication, the pathloss reference for a secondary serving cell can be based on the DL pathloss references configured in a primary cell or another secondary cell. With existing RRC information elements, but possibly with clarification for how UE determines the pathloss reference resource, or with additional RRC information elements, flexible reuse of DL pathloss reference signals across carriers can be possible.

According to a possible embodiment, pathloss reference/power control parameters for PUCCH can be determined via cross-carrier indication. For example, a UE can assume that for a given 'PUCCH-SpatialRelationInfo' configuration, the PUCCH pathloss reference signal and the reference signal indicated in the 'PUCCH-SpatialRelationInfo' can be originated from and/or associated with a cell that can be indicated in the 'PUCCH-SpatialRelationInfo', for example, via the proposed 'CellIndex' field as highlighted in the PUCCH-Config information element shown in Table 1, and in the BWP indicated by bwp-Id. In a similar context, other power control parameters, at least including the open-loop, such as Po and alpha, parameter 'q_u', and possibly also the closed-loop process index 'l', can also be originated from and/or associated with the same cell which can be indicated by the 'cell' field and in the BWP indicated by bwp-Id in the 'PUCCH-SpatialRelationInfo'.

TABLE 1

PUCCH-Config information element

```
-- ASN1START
-- TAG-PUCCH-CONFIG-START
PUCCH-Config ::=                                SEQUENCE {
    -- Lists for adding and releasing PUCCH resource sets (see 38.213, section 9.2)
    resourceSetToAddModList                     SEQUENCE (SIZE
(1..maxNrofPUCCH-ResourceSets)) OF PUCCH-ResourceSet
        OPTIONAL,   -- Need N
    resourceSetToReleaseList                    SEQUENCE (SIZE
(1..maxNrofPUCCH-ResourceSets)) OF PUCCH-ResourceSetId
        OPTIONAL,   -- Need N
    -- Lists for adding and releasing PUCCH resources applicable for the UL BWP and
serving cell in which the PUCCH-Config
    -- is defined. The resources defined herein are referred to from other parts of the
configuration to determine which
    -- resource the UE shall use for which report.
    resourceToAddModList                        SEQUENCE (SIZE
(1..maxNrofPUCCH-Resources)) OF PUCCH-Resource
        OPTIONAL,   -- Need N
    resourceToReleaseList                       SEQUENCE (SIZE
(1..maxNrofPUCCH-Resources)) OF PUCCH-ResourceId
        OPTIONAL,   -- Need N
    -- Configuration of the spatial relation between a reference RS and PUCCH. Reference
RS can be SSB/CSI-RS/SRS.
    -- If the list has more than one element, MAC-CE selects a single element (see 38.321,
section FFS_Section).
    -- Corresponds to L1 parameter 'PUCCH-SpatialRelationInfo' (see 38.213, section
FFS_Section)
    spatialRelationInfoToAddModList             SEQUENCE (SIZE
(1..maxNrofSpatialRelationInfos)) OF PUCCH-SpatialRelationInfo    OPTIONAL,   --
Need N
    spatialRelationInfoToReleaseList            SEQUENCE (SIZE
(1..maxNrofSpatialRelationInfos)) OF PUCCH-SpatialRelationInfoId  OPTIONAL,   --
Need N
    pucch-PowerControl                          PUCCH-PowerControl
                OPTIONAL,   -- Need M
    ...
}
PUCCH-SpatialRelationInfo ::=                   SEQUENCE {
    pucch-SpatialRelationInfoId                 PUCCH-
SpatialRelationInfoId,
-- The carrier which the RS is located in. If the field is absent, it applies to the serving cell
in which the PUCCH-SpatialRelationInfo is configured.
    cell                                        ServCellIndex
        OPTIONAL,   -- Need R    ---The DL BWP which the RS is located in. This field is
mandatory present if csi-RS-Index or srs is included, absent otherwise
    bwp-Id                                      BWP-Id
                OPTIONAL -- Cond CSI-RS-Indicated or SRS-Indicated
    referenceSignal                             CHOICE {
        ssb-Index
        SSB-Index,
        csi-RS-Index                            NZP-CSI-
RS-ResourceId,
        srs
        SRS-ResourceId
    },
    pucch-PathlossReferenceRS-Id                PUCCH-
PathlossReferenceRS-Id,
    p0-PUCCH-Id                                 P0-PUCCH-
Id,
    closedLoopIndex
    ENUMERATED { i0, i1 }
}
PUCCH-SpatialRelationInfoId ::=                 INTEGER
(1..maxNrofSpatialRelationInfos)
-- TAG-PUCCH-CONFIG-STOP
-- ASN1STOP
```

According to this embodiment, if the UE is configured with parameter PUCCH-Spatial-RelationInfo with multiple values, but MAC-CE has not activated any of them, then a pre-defined spatial relation and its corresponding power control parameters can be used as default values, where the power control parameters including at least the DL pathloss reference '$q\_d$' and the open-loop parameter '$q\_u$', and possibly also the closed-loop power control parameter, can be originated from and/or associated with the same cell which can be indicated by the 'cell' field in the default value of 'PUCCH-SpatialRelationInfo'.

In one example, the power control parameters, PUCCH Pathloss reference, Po, and possibly closed-loop process index 'l', indicated in the 'PUCCH-SpatialRelationInfo' can refer to the parameters/indices configured in the serving cell indicated by the 'cell' field in the 'PUCCH-SpatialRelation- Info' configuration. In one example, the serving cell indicated by the 'cell' can be an SCell and can be configured with a 'pathlossReferenceLinking' parameter that can indicate the pathloss reference to be the primary cell, in which case the pucch-PathlossReferenceRS-Id can correspond to the Id and the associated DL RS for pathloss configured in the primary cell for the SCell indicated by the 'cell' in the 'PUCCH-SpatialRelationInfo' configuration. The other power control parameters, Po and possibly closed-loop process index 'l', can be the parameters configured in the serving cell indicated by the 'cell' field in 'PUCCH-SpatialRelationInfo'. If the serving cell in which the PUCCH-SpatialRelationInfo is configured is a SCell, the primary cell can be the same for both the serving cell in which the PUCCH-SpatialRelationInfo is configured and the serving cell SCell indicated by the 'cell' in the 'PUCCH-SpatialRelationInfo' configuration.

In another example, the power control parameters, PUCCH Pathloss reference, Po, and possibly closed-loop process index 'l', indicated in the 'PUCCH-SpatialRelationInfo' can refer to the parameter indices configured for the serving cell in which the PUCCH-SpatialRelationInfo is configured irrespective of whether the 'cell' field is present. If present, the 'cell' field can be used to indicate the carrier in which the spatial relation referenceSignal is located in to determine the spatial relation of the UL transmit beam. In this case, the same spatial domain transmission filter can be used as the spatial domain transmission filter for the reception of the referenceSignal on the 'bwp-Id' of the 'cell'.

In one example, if the 'pathlossReferenceLinking' field exists in a serving cell configuration and indicates whether the pathloss reference cell is either PCell/PSCell or Scell, such as the secondary cell itself, a UE can assume that all the pathloss reference signals for the serving cell are originated from/associated with the indicated PCell/PSCell or SCell. In this case, the pathloss reference signal and the reference signal indicated in the 'PUCCH-SpatialRelationInfo' may or may not be originated from the same cell. In a similar context, other power control parameters, at least including the open-loop, Po and alpha, parameter 'q_u', and possibly the closed-loop process index 'l', can also be originated from and/or associated with the indicated PCell/PSCell or SCell indicated by 'pathlossReferenceLinking'. Alternatively, the parameters can be configured in the serving cell indicated by the 'cell' field in 'PUCCH-SpatialRelationInfo'.

TABLE 2

ServingCellConfig information element

From TS 38.331 v15.1.0
ServingCellConfig ::=           SEQUENCE {
<unrelated parts omitted>
    -- Indicates whether UE shall apply as pathloss reference either
the downlink of PCell or of SCell that corresponds with this uplink
    -- (see 38.213, section 7)
        pathlossReferenceLinking           ENUMERATED{pCell,sCell}
                                                                                        OPTIONAL
        -- Cond SCellOnly
}

In another embodiment, a network entity, for example, a gNB, a TRP, or other network entity, can explicitly indicate an associated cell of a given pathloss reference resource for PUCCH, for example, under the 'PUCCH-PathlossReferenceRS' field of 'PUCCH-PowerControl' information element as shown in the Table 3 below. The bwp-Id field as shown in Table 1 can also be included to indicate the BWP in which the PUCCH pathloss reference RS is located. The bwp-Id field may be mandatorily present if csi-RS-Index is included and can be otherwise absent.

TABLE 3

PUCCH-PowerControl information element

-- ASN1START
-- TAG-PUCCH-POWERCONTROL-START
PUCCH-PowerControl ::=                      SEQUENCE {
        -- A set of Reference Signals (e.g. a CSI-RS config or a SSblock) to be used for PUCCH
pathloss estimation.
        -- Up to maxNrofPUCCH-PathlossReference-RSs may be configured
        -- FFS_CHECK: Is it possible not to configure it at all? What does the UE use then?
Any SSB?
        -- Corresponds to L1 parameter 'pucch-pathlossReference-rs-config' (see 38.213, section
7.2)
        pathlossReferenceRSs                       SEQUENCE (SIZE (1..maxNrofPUCCH-
PathlossReferenceRSs)) OF PUCCH-PathlossReferenceRS OPTIONAL, -- Need M
        -- Number of PUCCH power control adjustment states maintained by the UE (i.e., g(i)).
If the field is present (n2) the UE maintains
        -- two power control states (i.e., g(i,0) and g(i,1)). Otherwise, it applies one (i.e., g(i,0)).
        -- Corresponds to L1 parameter 'num-pucch-pcadjustment-states' (see 38.213, section
7.2)
        twoPUCCH-PC-AdjustmentStates         ENUMERATED {twoStates}
                                OPTIONAL, -- Need R
        ...
}
-- P0 value for PUCCH. Corresponds to L1 parameter 'p0-pucch' (see 3,213, section 7.2)
P0-PUCCH ::=                                                                SEQUENCE {
    p0-PUCCH-Id                                                             P0-PUCCH-Id,
    -- P0 value for PUCCH with 1dB step size.
    p0-PUCCH-Value                                                      INTEGER (−16..15)
}
P0-PUCCH-Id ::=                                                             INTEGER (1..8)
-- A reference signal (RS) configured as pathloss reference signal for PUCCH power control
-- Corresponds to L1 parameter 'pucch-pathlossReference-rs' (see 38.213, section 7.2)
PUCCH-PathlossReferenceRS ::=                                   SEQUENCE {
        pucch-PathlossReferenceRS-Id                            PUCCH-
PathlossReferenceRS-Id, TABLE 3-continued

| PUCCH-PowerControl information element |
|---|

```
-- The carrier which the RS is located in. If the field is absent, it applies to the serving cell in
which the PUCCH-PathlossReferenceRS is configured.
        cell                                          ServCellIndex
            OPTIONAL,   -- Need R
        referenceSignal                               CHOICE {
            ssb-Index                                 SSB-
Index,
            csi-RS-Index                              NZP-CSI-
RS-ResourceId
        }
    }
}
-- ID for a referemce signal (RS) configured as PUCCH pathloss reference
-- Corresponds to L1 parameter 'pucch-pathlossreference-index' (see 38.213, section 7.2)
-- FFS_CHECK: Is this ID used anywhere except inside the PUCCH-PathlossReference-RS
    itself? If not, remove.
PUCCH-PathlossReferenceRS-Id ::=         INTEGER (0..maxNrofPUCCH-
PathlossReferenceRSs-1)
-- TAG-PUCCH-POWERCONTROL-STOP
-- ASN1STOP
```

According to a possible embodiment, power control parameters for PUSCH associated with Semi-Persistent SRS (SP-SRS) can be determined without cross-carrier indication. For example, for an SP-SRS resource set, the semi-statically configured spatial relations/beams for the SRS resources within the SP-SRS resource set can be overridden by a new list of spatial relations that are provided by the MAC-CE command that activates the SP-SRS resource set.

In one embodiment, if MAC-CE provides a new list of spatial relations for the SRS resources within the SP-SRS resource, then the MAC-CE can also provide a new mapping between the SRIs [SRS Resource Indicators] for that set and the PUSCH power control parameters (j, q_d, l) that overrides the semi-statically configured mapping between SRIs for that set and the PUSCH power control parameters.

According to a possible embodiment, DL pathloss reference/power control parameters for PUSCH can be determined via cross-carrier indication.

In one example, PUSCH grant DCI can include an SRI (SRS resource Indicator) field that indicates one or more SRS Resource indices with which the UE can determine the PUSCH transmission precoder and transmission rank for non-codebook-based UL transmission. The SRS resource spatial relation information can include the cell index and BWP index, as shown in Table 4, that the UE can use to transmit the PUSCH transmission with the same spatial domain transmission filter used for the reception of the reference RS indicated in the spatialRelationInfo in SRS-Resource. The UE can be configured with SRI-PUSCH-PowerControl which can provide a mapping between the SRI and PUSCH power control parameters as shown in Table 5. In one example, the PUSCH power control parameters corresponding to the indicated SRI-PUSCH Pathloss reference, Po, alpha, and possibly closed-loop process index 'l' as given by SRI-PUSCH-PowerControl mapping can refer to the parameters/indices configured in the serving cell indicated by the 'cell' field in the spatialRelationInfo of the indicated 'SRS-Resource' configuration, as shown in Table 5. In a case where multiple SRS resources are indicated by the SRI field, such as in non-codebook-based UL transmissions, the 'cell' field in the spatialRelationInfo of the lowest index SRS-Resource, such as the SRS-Resource with the lowest value of srs-ResourceId, can be used. The 'pathlossReferenceLinking' can be the parameter configured in the serving cell (SCell) given by the 'cell' field. In one example, the serving cell indicated by the 'cell' can be a SCell and can be configured with a 'pathlossReferenceLinking' parameter that can indicate the pathloss reference to be the primary cell. In this case, the sri-PUSCH-PathlossReferenceRS-Id can correspond to the Id and associated DL RS for pathloss configured in the primary cell for the SCell indicated by the 'cell' in the spatialRelationInfo of the indicated 'SRS-Resource' configuration. The other power control parameters, such as Po, alpha, and possibly closed-loop process index 'l', can be the parameters configured in the serving cell indicated by the 'cell' field in the indicated spatialRelationInfo of the 'SRS-Resource' configuration. If the serving cell in which the 'SRS-Resource' is configured is a SCell, the primary cell can be the same for both the serving cell in which the 'SRS-Resource' is configured and the serving cell SCell indicated by the 'cell' in the spatialRelationInfo of the indicated 'SRS-Resource' configuration.

TABLE 4

| Spatial relation in SRS-Resource of SRS-Config information element |
|---|

```
SRS-Resource ::=                              SEQUENCE {
    srs-ResourceId                            SRS-ResourceId,
< parts omitted>
    spatialRelationInfo                       SEQUENCE {
    -- The carrier which the RS is located in. If the field is absent, it applies to the serving
cell in which the SRS-Resource is configured.
        cell                                  ServCellIndex
            OPTIONAL,   -- Need R   ---The DL BWP which the RS is located in. This field is
mandatory present if csi-RS-Index or srs is included, absent otherwise
        bwp-Id                                BWP-Id
                                       OPTIONAL -- Cond CSI-RS-Indicated or SRS-Indicated
        referenceSignal                       CHOICE {
```

TABLE 4-continued

Spatial relation in SRS-Resource of SRS-Config information element

```
        ssb-Index                                   SSB-Index,
        csi-RS-Index
    NZP-CSI-RS-ResourceId,
        srs
    SRS-ResourceId
    }
...
}
```

TABLE 5

SRI-PUSCH-PowerControl in PUSCH-PowerControl information element

```
PUSCH-PowerControl ::=                      SEQUENCE {
<parts omitted>
    -- A set of PUSCH power control parameters associated with one SRS-ResourceIndex
(SRI)
        SRI-PUSCH-PowerControl ::=              SEQUENCE {
        sri-PUSCH-PowerControlId                SRI-PUSCH-PowerControlId,
        sri-PUSCH-PathlossReferenceRS-Id        PUSCH-PathlossReferenceRS-Id,
        sri-P0-PUSCH-AlphaSetId                 P0-PUSCH-AlphaSetId,
        sri-PUSCH-ClosedLoopIndex                   ENUMERATED { i0, i1 }
        }
SRI-PUSCH-PowerControlId ::=                INTEGER (0..maxNrofSRI-PUSCH-
Mappings-1)
...
}
```

In another example, the power control parameters, such as PUSCH Pathloss reference, Po, alpha, and possibly closed-loop process index 'l', in the spatialRelationInfo of the indicated 'SRS-Resource' spatialRelationInfo configuration can refer to the parameters indices configured for the serving cell in which the 'SRS-Resource' is configured irrespective of whether the 'cell' field is present in the spatialRelation-Info of the indicated 'SRS-Resource'. If present, the 'cell' field can be used to indicate the carrier in which the spatial relation referenceSignal is located in to determine the spatial relation of the UL transmit beam. For example, the same spatial domain transmission filter can be used as the spatial domain transmission filter used for the reception of the referenceSignal on the 'bwp-Id' of the 'cell'.

According to a possible embodiment, a network entity, such as a gNB, a TRP, a network controller, or other network entity, can explicitly indicate an associated cell of a given pathloss reference resource for PUSCH, for example, under the 'PUSCH-PathlossReferenceRS' field of 'PUSCH-PowerControl' information element, as shown in Table 6 below. The network entity can explicitly indicate an associated cell of a given pathloss reference resource for PUSCH based on an explicit RRC configuration of a reference cell-index. The bwp-Id field as shown in Table 1 can also be included to indicate the BWP in which the PUSCH pathloss reference RS is located. The bwp-Id field can be mandatorily present if csi-RS-Index is included and can be absent otherwise. This implementation can apply to both grant-based PUSCH and grant-free/configured grant Type 2 based on activation DCI.

TABLE 6

PUSCH-PowerControl information element

```
-- A reference signal (RS) configured as pathloss reference signal for
PUSCH power control
-- Corresponds to L1 parameter 'pusch-pathlossReference-rs'
(see 38.213, section 7.1)
```

TABLE 6-continued

PUSCH-PowerControl information element

```
PUSCH-PathlossReferenceRS ::=               SEQUENCE {
    pusch-PathlossReferenceRS-Id            PUSCH-
PathlossReferenceRS-Id,
    -- The carrier which the RS is located in. If the field is absent, it
applies to the serving cell in which the PUSCH-PathlossReferenceRS
is configured.
    cell                                    ServCellIndex
    OPTIONAL, -- Need R
reference Signal                            CHOICE {
        ssb-Index
    SSB-Index,
        csi-RS-Index
    NZP-CSI-RS-ResourceId
    }
}
```

According to a possible embodiment, an implicit approach can be used based on the RRC "pathlossReferenceLinking field. For example, if the 'pathlossReferenceLinking' field, such as in Table 2 above, exists in a serving cell configuration and indicates whether the pathloss reference cell is either PCell/PSCell or Scell, such as the secondary cell itself, a UE can assume that all the pathloss reference signals for the serving cell are originated from/associated with the indicated PCell/PSCell or SCell. In this case, the pathloss reference signal and the reference signal(s) indicated in the SpatialRelationInfo's in the SRS resource(s) corresponding to the SRI field in the uplink grant/DCI may or may not be originated from the same cell. In a similar context, other power control parameters, such as at least including the open-loop, Po and alpha, parameter T and possibly also the closed-loop process index 'l', may also be originated from or associated with the indicated PCell/PSCell or SCell indicated by 'pathlossReferenceLinking'.

Alternatively, the other power control parameters can be configured in the serving cell indicated by the 'cell' field in the indicated 'SRS-Resource' by the SRI field. In case multiple SRS resources are indicated by the SRI field, as in non-codebook-based UL transmission, the 'cell' field in the lowest index SRS-Resource, such as the SRS-Resource with the lowest value of srs-ResourceId, can be used. The 'pathlossReferenceLinking' can be the parameter configured in a serving cell, such as a Scell, given by the 'cell' field. This implementation can apply to both grant-based PUSCH and grant-free/configured grant Type 2 based on activation DCI.

According to a possible embodiment, an implicit approach can be based on re-using the cell index field in SRS 'SpatialRelationInfo'. For example, the following implementations for grant-based PUSCH transmission can be conditioned on the spatial relation for PUSCH transmission being based on the spatial relation(s) configured for one or multiple SRS resources in a periodic or aperiodic SRS resource set, which can be in turn, configured for uplink codebook-based or uplink non-codebook-based PUSCH transmission.

According to a first possible implementation, if the PUSCH transmission is scheduled by a DCI format 0_0, or if the PUSCH transmission is scheduled by an uplink DCI format 0_1 that does not contain an SRI field, as the SRS resource set may contain only one SRS resource, then the first configured PUSCH power control parameters, such as j=2, q_d=0, and l=0, can be used. These PUSCH power control parameters, at least including the DL pathloss reference 'q_d=0' and the open-loop parameter index 'j=2', can be originated from/associated with the serving cell/uplink carrier/BWP indicated by the cell/carrier index and BWP index in the 'SpatialRelationInfo' field of that single SRS resource.

According to a second possible implementation, the following exemplifications can be conditioned on the PUSCH transmission being scheduled by an uplink DCI format 0_1 that includes an SRI field. According to a first possible exemplification of the second implementation, if the SRS resource set contains more than one SRS resource but only one SRS resource from that set can be transmitted simultaneously, as is the case, for example, with codebook-based PUSCH transmission in the current 3GPP RAN1 spec with 2 SRS resources within the set but only one can be transmitted at a time, or if the SRI indicates transmission/selection of only one SRS resource from that set, as is the case, for example, with non-codebook-based PUSCH transmission in the current 3GPP RAN1 spec with 4 SRS resources within, but SRI=0 or SRI=1 indicate the transmission of a single SRS resource and thereby a rank-1/1-layer PUSCH transmission, then the PUSCH power control parameters can be based on the SRI to PUSCH power control parameter mapping. These PUSCH power control parameters at least including the DL pathloss reference 'q_d' and the open-loop parameter index 'j' can be originated from/associated with the serving cell/uplink carrier/BWP indicated by the cell/carrier index and BWP index in the 'SpatialRelationInfo' field of that single SRS resource. In one example, the SRI to PUSCH power control parameter mapping within the current serving cell can be used, but the indicated parameters can be interpreted to belong to the indicated serving cell/uplink carrier/BWP. In another example, the SRI to PUSCH power control parameter mapping within the indicated serving cell/uplink carrier/BWP can be used, but the SRI from the current serving cell can be used to identify the PUSCH power control parameters.

According to a second possible exemplification of the second implementation, the following manifestations can be conditioned on the SRS resource set containing more than one SRS resource and the SRI indicating transmission/selection of more than one SRS resource from that set, as is the case, for example, with non-codebook-based PUSCH transmission with rank/number-of-layers >1 in the current 3GPP RAN1 spec. According to a first possible manifestation of the second exemplification, if the indicated SRS resources all have the same cell/uplink carrier index and BWP index in their 'SpatialRelationInfo' fields, then the PUSCH power control parameters can be based on the SRI to PUSCH power control parameter mapping. These PUSCH power control parameters at least including the DL pathloss reference 'q_d' and the open-loop parameter index 'j' can be originated from/associated with the serving cell/uplink carrier/BWP indicated by the common cell/carrier index and BWP index in the 'SpatialRelationInfo' field of that single SRS resource. In one example, the SRI to PUSCH power control parameter mapping within the current serving cell can be used, but the indicated parameters can be interpreted to belong to the indicated serving cell/uplink carrier/BWP. In another example, the SRI to PUSCH power control parameter mapping within the indicated serving cell/uplink carrier/BWP can be used, but the SRI from the current serving cell can be used to identify the PUSCH power control parameters.

According to a second possible manifestation of the second exemplification, the following examples can be conditioned on the indicated SRS resources having different cell/uplink carrier index or BWP index in their 'SpatialRelationInfo' fields.

In a first possible example, if one of the cell/uplink carrier indexes in the 'SpatialRelationInfo' fields of those SRS resources correspond to a primary cell, such as a PCell or PSCell, then the PUSCH power control parameters at least including the DL pathloss reference 'q_d' and the open-loop parameter index 'j' can be originated from/associated with that primary serving cell/uplink carrier and the corresponding BWP can be indicated by the BWP index in that SRS resource.

In a second possible example, if one of the cell/uplink carrier indexes in the 'SpatialRelationInfo' fields of those SRS resources correspond to the current cell/uplink carrier itself or if the cell/uplink carrier index is not present for one of indicated SRS resources, then the PUSCH power control parameters at least including the DL pathloss reference 'q_d' and the open-loop parameter index 'j' can be originated from/associated with the current serving cell/uplink carrier itself and the corresponding BWP can be indicated by the BWP index in that SRS resource.

In a third possible example, the PUSCH power control parameters at least including the DL pathloss reference 'q_d' and the open-loop parameter index 'j' can be originated from/associated with the serving cell/uplink carrier with lowest index and the corresponding BWP can be indicated by the BWP index in that SRS resource.

In at least some of the examples above, PUSCH power control parameters can be based on the SRI to PUSCH power control parameter mapping. How to apply this mapping can follow at least one of the following two cases or other cases. In the first case, the SRI to PUSCH power control parameter mapping within the current serving cell can be used, but the indicated parameters can be interpreted to belong to the identified serving cell/uplink carrier/BWP. In the second case, the SRI to PUSCH power control parameter mapping within the identified serving cell/uplink carrier/BWP can be used, but the SRI from the current serving cell can be used to identify the PUSCH power control parameters.

According to another possible embodiment, for grant-based PUSCH transmission, if the spatial relation for PUSCH transmission is based on the spatial relation(s) configured for one or multiple SRS resources in a SP-SRS resource set, and if a MAC-CE command that activates the SP-SRS resource provides a new mapping between the SRIs for that set and the PUSCH power control parameters (j, q_d, l) that overrides the semi-statically configured mapping between SRIs for that set and the PUSCH power control parameters (j, q_d, l), then all embodiments above for cross-carrier indication of PUSCH power control parameters based on the implicit approach of using the cell index field in SRS 'SpatialRelationInfo' can be similarly applied, but the SRI to PUSCH power control mapping in those embodiments can be considered to be the new mapping provided by the MAC-CE.

According to a possible embodiment, DL pathloss reference/power control parameters can be determined for grant-free/configured grant Type-2 PUSCH. For example, the following implementations for grant-free/configured-grant Type-2 PUSCH transmission can be conditioned on the spatial relation for PUSCH transmission being based on the spatial relation(s) configured for one or multiple SRS resources in a periodic or aperiodic SRS resource set, which can be in turn, configured for uplink codebook-based or uplink non-codebook based PUSCH transmission.

According to a first possible implementation, if activation DCI for grant-free/configured-grant Type-2 PUSCH transmission does not contain an SRI field, then the first configured DL pathloss reference for PUSCH, such as q_d=0, can be used. In this case, the DL pathloss reference 'q_d=0' can be originated from/associated with the serving cell/uplink carrier/BWP indicated by the cell/carrier index and the BWP index in the 'SpatialRelationInfo' field of a predefined/default SRS resource, such as SRS resource index 0.

According to a second possible implementation, if activation DCI for grant-free/configured-grant Type-2 PUSCH transmission contains an SRI field that indicates transmission/selection of only one SRS resource from the SRS resource set, then at least the DL pathloss reference 'q_d' and possibly the open-loop parameter index 'j' can be based on the SRI to PUSCH power control parameter mapping. In this case, DL pathloss reference 'q_d' and possibly the open-loop parameter index 'j' can be originated from/associated with the serving cell/uplink carrier/BWP indicated by the cell/carrier index and the BWP index in the 'SpatialRelationInfo' field of that single SRS resource. In one possible example, the SRI to PUSCH power control parameter mapping within the current serving cell can be used, but the indicated power control parameters can be interpreted to belong to the indicated serving cell/uplink carrier/BWP. In another possible example, the SRI to PUSCH power control parameter mapping within the indicated serving cell/uplink carrier/BWP can be used, but the SRI from the current serving cell can be used to identify the PUSCH power control parameters.

According to a third possible implementation, the following exemplifications can be based on activation DCI for grant-free/configured-grant Type-2 PUSCH transmission containing an SRI field that indicates transmission/selection of more than one SRS resource from the SRS resource set. According to a first possible exemplification, if the indicated SRS resources all have the same cell/uplink carrier index and BWP index in their 'SpatialRelationInfo' fields, then at least the DL pathloss reference 'q_d' and possibly the open-loop parameter index 'j' can be based on the SRI to PUSCH power control parameter mapping. In this case, at least the DL pathloss reference 'q_d' and possibly the open-loop parameter index 'j' can be originated from/associated with the serving cell/uplink carrier/BWP indicated by the common cell/carrier index and the BWP index in the 'SpatialRelationInfo' field of that single SRS resource. In one possible example, the SRI to PUSCH power control parameter mapping within the current serving cell can be used, but the indicated power control parameters can be interpreted to belong to the indicated serving cell/uplink carrier/BWP. In another possible example, the SRI to PUSCH power control parameter mapping within the indicated serving cell/uplink carrier/BWP can be used, but the SRI from the current serving cell can be used to identify the PUSCH power control parameters.

According to a second possible exemplification, the following examples can be conditioned on the indicated SRS resources having different cell/uplink carrier index or BWP index in their 'SpatialRelationInfo' fields. According to a first possible example, if one of the cell/uplink carrier indexes in the 'SpatialRelationInfo' fields of those SRS resources correspond to a primary cell, such as a PCell or PSCell, then at least the DL pathloss reference 'q_d' and possibly the open-loop parameter index 'j' can be originated from/associated with that primary serving cell/uplink carrier and the corresponding BWP indicated by the BWP index in that SRS resource.

According to a second possible example, if one of the cell/uplink carrier indexes in the 'SpatialRelationInfo' fields of those SRS resources correspond to the current cell/uplink carrier itself or if the cell/uplink carrier index is not present for one of indicated SRS resources, then at least the DL pathloss reference 'q_d' and possibly the open-loop parameter index 'j' can be originated from/associated with the current serving cell/uplink carrier itself and the corresponding BWP indicated by the BWP index in that SRS resource.

According to a third possible example, at least the DL pathloss reference 'q_d' and possibly the open-loop parameter index 'j' can be originated from/associated with the serving cell/uplink carrier with lowest index and the corresponding BWP indicated by the BWP index in that SRS resource.

In at least some of the examples above, at least the DL pathloss reference 'q_d' and possibly the open-loop parameter index 'j' can be based on the SRI to PUSCH power control parameter mapping, where how to apply the mapping can follow at least one of the following two cases or other possible cases. In the first case, the SRI to PUSCH power control parameter mapping within the current serving cell can be used, but the indicated power control parameters can be interpreted to belong to the identified serving cell/uplink carrier/BWP. In the second case, the SRI to PUSCH power control parameter mapping within the identified serving cell/uplink carrier/BWP can be used, but the SRI from the current serving cell can be used to identify the PUSCH power control parameters.

According to a possible embodiment, DL pathloss reference/power control parameters can be determined for grant-free/configured grant Type-1 PUSCH. For example, for grant-free/configured-grant Type-1 PUSCH transmission, a network entity can explicitly indicate an associated cell of a given pathloss reference resource for grant-free Type-1 PUSCH, for example, under the 'rrc-ConfiguredUplinkGrant' field of 'ConfiguredGrantConfig' information element. Table 7 below can include an example ConfiguredGrantConfig information element according to at least this embodiment. In a similar context, at least the open-loop parameter index 'j' can also be associated with the indicated cell.

TABLE 7

ConfiguredGrantConfig information element

```
-- ASN1START
-- TAG-CONFIGUREDGRANTCONFIG-START
ConfiguredGrantConfig ::=                    SEQUENCE {
    <unrelated part omitted>
    -- Selection between config 1 and config
    -- Selection between "configured grant" transmission with fully RRC-configured UL
grant (Type1)
    -- or with UL grant configured by DCI addressed to CS-RNTI (Type2).
    rrc-ConfiguredUplinkGrant          SEQUENCE {
        -- Offset related to SFN=0
        timeDomainOffset                                    INTEGER
(0..5119),
        -- Corresponding to the DCI field of time domain resource assignment,
and the maximum bit width is 4.
        --(see 38.214, section 6.1.2 and 38.212, section 7.3.1)
        timeDomainAllocation                                INTEGER
(0..15), -- RAN1 indicated just "Mapping-type,Index-start-len"
        -- Corresponding to the DCI field of freq domain resource assignment.
        -- (see 38.214, section 6.1.2, and 38.212, section 7.3.1)
        frequencyDomainAllocation                BIT STRING
(SIZE(18)),
        -- UE-specific DMRS configuration: corresponding to the DCI field of
antenna ports, and the maximum bitwidth is 5.
        -- (see 38.214, section 6.1.2, and 38.212, section 7.3.1)
        antennaPort                                         INTEGER (0..31),
        dmrs-SeqInitialization                   INTEGER (0..1)
                OPTIONAL, -- Cond NoTransformPrecoder
        precodingAndNumberOfLayers                  INTEGER (0..63),
        srs-ResourceIndicator                       INTEGER (0..15),
        -- The modulation order, target code rate and TB size (see 38.214, section
6.1.2)
        mcsAndTBS
    INTEGER (0..31),
        -- Enables intra-slot frequency hopping with the given frequency hopping
offset
        -- Corresponds to L1 parameter 'UL-TWG-hopping' (see 38.214, section
FFS_Section)
        frequencyHoppingOffset                              INTEGER
(1.. maxNrofPhysicalResourceBlocks–1),
        pathlossReferenceIndex                              INTEGER
(0..maxNrofPUSCH-PathlossReferenceRSs–1),
            -- The carrier which the pathlossReference is located in. If the field is absent, it applies
to the serving cell in which the ConfiguredGrantConfig is configured.
        cellIndex               ServCellIndex        OPTIONAL, --
Need R
        ...
    }
    OPTIONAL -- Cond Type1
}
CG-UCI-OnPUSCH ::= CHOICE {
    dynamic                                         SEQUENCE
(SIZE (1..4)) OF BetaOffsets,
    semiStatic                          BetaOffsets
}
-- TAG-CONFIGUREDGRANTCONFIG-STOP
-- ASN1STOP
```

According to a possible embodiment, DL pathloss reference/power control parameters for SRS, such as an SRS resource set, can be determined via cross-carrier indication. At least one possible implementation can provide an explicit approach based on the RRC configuration of a reference cell index. For example, for cross-carrier indication for SRS power control parameters, a network entity can explicitly indicate an associated cell index under 'SRS-ResourceSet' information element. Table 8 below can include an example SRS-ResourceSet information element according to at least this embodiment. In this case, the DL pathloss reference index can be interpreted to belong to the indicated cell. In a similar context, at least the open-loop parameter index 'j' can also be associated with the indicated cell.

TABLE 8

SRS-ResourceSet information element

```
SRS-ResourceSet ::=                          SEQUENCE {
    -- The ID of this resource set. It is unique in the context of the BWP in which the parent
SRS-Config is defined.
    srs-ResourceSetId                       SRS-ResourceSetId,
```

TABLE 8-continued

SRS-ResourceSet information element

```
            -- The IDs of the SRS-Reosurces used in this SRS-ResourceSet
        srs-ResourceIdList                          SEQUENCE
(SIZE(1..maxNrofSRS-ResourcesPerSet)) OF SRS-ResourceId        OPTIONAL, --
Cond Setup
-- The carrier which the SRS Resource set is located in. If the field is absent, it applies to the
serving cell in which the SRS-ResourceSet is configured.
cellIndex ::=                                ServCellIndex
        OPTIONAL, -- Need R
resourceType                                 CHOICE {
        aperiodic                            SEQUENCE
{
                -- The DCI "code point" upon which the UE shall transmit SRS
according to this SRS resource set configuration.
                -- Corresponds to L1 parameter 'AperiodicSRS-ResourceTrigger' (see
38.214, section 6.1.1.2)
            aperiodicSRS-ResourceTrigger         INTEGER
(0..maxNrofSRS-TriggerStates-1),
                -- ID of CSI-RS resource associated with this SRS resource set. (see
38.214, section 6.1.1.2)
            csi-RS                               NZP-
CSI-RS-ResourceId,
                -- An offset in number of slots between the triggering DCI and the actual
transmission of this SRS-ResourceSet.
                -- If the field is absent the UE applies no offset (value 0)
            slotOffset
    INTEGER (1..8)
                    OPTIONAL, -- Need S
            ...
        },
        semi-persistent                          SEQUENCE
{
                -- ID of CSI-RS resource associated with this SRS resource set in non-
codebook based operation.
                -- Corresponds to L1 parameter 'SRS-AssocCSIRS' (see 38.214, section
6.2.1)
            associatedCSI-RS        NZP-CSI-RS-ResourceId
        OPTIONAL, -- Cond nonCodebook
                ...
        },
        periodic                                 SEQUENCE
{
                -- ID of CSI-RS resource associated with this SRS resource set in non-
codebook based operation.
                -- Corresponds to L1 parameter 'SRS-AssocCSIRS' (see 38.214, section
6.2.1)
            associatedCSI-RS        NZP-CSI-RS-ResourceId
        OPTIONAL, -- Cond nonCodebook
                ...
        }
    },
    -- Indicates if the SRS resource set is used for beam management vs. used for either
codebook based or non-codebook based transmission.
        -- Corresponds to L1 parameter 'SRS-SetUse' (see 38.214, section 6.2.1)
        -- FFS_CHECK: Isn't codebook/noncodebook already known from the ulTxConfig in
the SRS-Config? If so, isn't the only distinction
        -- in the set between BeamManagement, AtennaSwitching and "Other"? Or what
happens if SRS-Config=Codebook but a Set=NonCodebook?
        usage                                  ENUMERATED
{beamManagement, codebook, nonCodebook, antennaSwitching},
        -- alpha value for SRS power control. Corresponds to L1 parameter 'alpha-srs' (see
38.213, section 7.3)
        -- When the field is absent the UE applies the value 1
        alpha                                    Alpha
                    OPTIONAL, -- Need S
    -- P0 value for SRS power control. The value is in dBm. Only even values (step size 2)
are allowed.
        -- Corresponds to L1 parameter 'p0-srs' (see 38.213, section 7.3)
        p0                                       INTEGER (-
202..24)
```

TABLE 8-continued

SRS-ResourceSet information element

```
                                            OPTIONAL, -- Cond Setup
        -- A reference signal (e.g. a CSI-RS config or a SSblock) to be used for SRS path loss
estimation.
        -- Corresponds to L1 parameter 'srs-pathlossReference-rs-config' (see 38.213, section
7.3)
        pathlossReferenceRS                     CHOICE {
            ssb-Index                               SSB-Index,
            csi-RS-Index                            NZP-CSI-RS-
ResourceId
        }
                                            OPTIONAL, -- Need M
        -- Indicates whether hsrs,c(i) = fc(i,1) or hsrs,c(i) = fc(i,2) (if twoPUSCH-PC-
AdjustmentStates are configured)
        -- or serarate close loop is configured for SRS. This parameter is applicable only for Uls
on which UE also transmits PUSCH.
        -- If absent or release, the UE applies the value sameAs-Fci1
        -- Corresponds to L1 parameter 'srs-pcadjustment-state-config' (see 38.213, section 7.3)
        srs-PowerControlAdjustmentStates        ENUMERATED { sameAsFci2,
separateClosedLoop}                             OPTIONAL, -- Need S
        ...
}
```

According to a possible embodiment an explicit approach can be provided based on the RRC "pathlossReferenceLinking" field. For example, if the 'pathlossReferenceLinking' field, such as in Table 2 above, exists in a serving cell configuration and indicates whether the pathloss reference cell is either PCell/PSCell or Scell, such as the secondary cell itself, the UE can assume that all the pathloss reference signals for SRS for the serving cell are originated from/associated with the indicated PCell/PSCell or SCell. In this case, the pathloss reference signal and the reference signal(s) indicated in the SpatialRelationInfo's in the SRS resource(s) within the SRS resource set may or may not be originated from the same cell. In a similar context, other power control parameters, such as at least including the open-loop, Po and alpha, parameter 'j' and possibly also the closed-loop process index 'l', may be also originated from/associated with the indicated PCell/PSCell or SCell.

According to a possible embodiment, an implicit approach can be based on re-using the cell index field in SRS 'SpatialRelationInfo'. According to a first possible implementation, if an SRS resource set contains a single SRS resource, or if an SRS resource set contains more than one SRS resources, but all have the same serving cell/uplink carrier index and BWP index in their 'SpatialRelationInfo' fields, then at least the pathloss reference signal and possibly the open-loop parameter index for that SRS resource set on that serving cell can be originated from/associated with that single/common serving cell/uplink carrier and BWP indicated in 'SpatialRelationInfo' fields.

According to a second possible implementation, if an SRS resource set contains more than one SRS resources and they have different serving cell/uplink carrier indexes or BWP indexes in their 'SpatialRelationInfo' fields, then at least the pathloss reference signal and possibly the open-loop parameter index for that SRS resource set on that serving cell can be originated from/associated with at least one of the following examples.

According to a first example of this second possible implementation, the pathloss reference signal and possibly the open-loop parameter index for that SRS resource set on that serving cell can be originated from/associated with the primary cell, such as a PCell or PSCell, and the corresponding BWP if at least one of the cell/uplink carrier indexes in the 'SpatialRelationInfo' fields of those SRS resources correspond to a primary cell.

According to a second example of this second possible implementation, the pathloss reference signal and possibly the open-loop parameter index for that SRS resource set on that serving cell can be originated from/associated with the current serving cell itself and the corresponding BWP if at least one of the serving cell/uplink carrier indexes in the 'SpatialRelationInfo' fields of those SRS resources correspond to the current cell/uplink carrier itself or if the cell/uplink carrier index is not present for one of indicated SRS resources.

According to a third example of this second possible implementation, the pathloss reference signal and possibly the open-loop parameter index for that SRS resource set on that serving cell can be originated from/associated with the lowest/highest index serving cell and the corresponding BWP among the serving cell/uplink carrier indexes indicated in the 'SpatialRelationInfo' fields of those SRS resources.

According to a possible embodiment, search spaces for Msg2/3/4 can be provided during random access. For example, a search space for Message 2, Message 3, and Message 4 (Msg2/3/4) during random access, for example, Type1-PDCCH common search space, can be the same as the search space of SystemInformationBlockType1 (SIB1), for example, Type0-PDCCH common search space, if not configured separately via the RRC parameter 'ra-SearchSpace'. While System Information (SI) and paging messages can be transmitted within configured and periodically occurring time windows and may not require HARQ-ACK feedback from a UE, Msg2 reception, Msg3 transmission, and Msg4 reception can be performed by a few UEs that transmitted a PRACH preamble on the same RACH occasion, and their transmission and reception timings can vary depending on the selected RACH occasion and HARQ-ACK feedback. For example, Msg3 PUSCH and Msg4 PDSCH can be transmitted and received by the UEs that transmitted the same PRACH preamble on the same RACH occasion. More specifically, Msg2 reception can be bounded within a Random Access Response (RAR) window and the RAR window length can be less than or equal to 10 ms and can start at least symbols after the last symbol of the preamble sequence transmission, where A can be defined in TS 38.133. Thus, the RAR window may not include a PDCCH monitoring occasion for SS/PBCH block i based on the Type0-PDCCH common search space configured by MasterInformationBlock (MIB), where the SS/PBCH block i can be selected by the UE for the PRACH preamble transmission.

According to a possible implementation of this embodiment, a UE can determine whether a RAR window includes a PDCCH monitoring occasion for the selected SS/PBCH block i based on the Type0-PDCCH common search space, and can monitor a separately configured RACH search space, such as configured via 'ra-SearchSpace', within the RAR window for Msg2 reception only if the RAR window does not include any PDCCH monitoring occasion for the selected SS/PBCH block i based on the Type0-PDCCH common search space.

The RRC parameter 'ra-SearchSpace' can indicate one or more starting OFDM symbols corresponding to one or more search spaces within a slot, where each search space within the slot can be associated with a different SS/PBCH block or CSI-RS resource and one or more SS/PBCH blocks or CSI-RS resources can be associated with one search space of the slot. Further, the RRC parameter 'ra-SearchSpace' can indicate at least one slot within a frame and at least one frame where monitoring occasions can occur. One or more slots within the frame can be configured for monitoring occasions of a given SS/PBCH block or CSI-RS resource.

According to another possible implementation, a UE can receive an indication in a RAR message indicating that the UE has to monitor PDCCH carrying a UL grant for Msg3 re-transmission and PDCCH carrying a DL assignment for Msg4 reception either based on the Type0-PDCCH common search space, such as a search space for SIB1, or based on the search space configured by the separate RRC parameter 'ra-SearchSpace'. Depending on time instances of a given RACH occasion, a corresponding RAR window, and the actual Msg2 transmission, a network entity can select potential time instances for PDCCH transmissions associated with Msg3 and Msg4 and indicate to the UE the selected monitoring occasions for PDCCHs associated with Msg3 and Msg4. In one example, monitoring occasions for PDCCH carrying the UL grant for Msg3 re-transmission and monitoring occasion for PDCCH carrying the DL assignment for Msg4 reception can be set to be the same.

In other implementations, a UE can monitor a separately configured RACH search space, such as configured via 'ra-SearchSpace', to receive PDCCHs for Msg2/3/4, if the UE selects a RACH occasion and a PRACH preamble based on a CSI-RS resource.

At least some embodiments can avoid a case where a PDCCH for Msg2 cannot be transmitted within a RAR window and yet can re-use a Common Control Resource Set (CORESET) configured for delivery of SI and paging messages. This can ease a network entity's burden to select a proper combination of a SS/PBCH block transmission pattern, a PRACH configuration, a TDD UL/DL slot configuration, and a RAR window length, and also allow the network entity to efficiently pack multiple common PDCCHs within the common CORESET.

Figure 2:
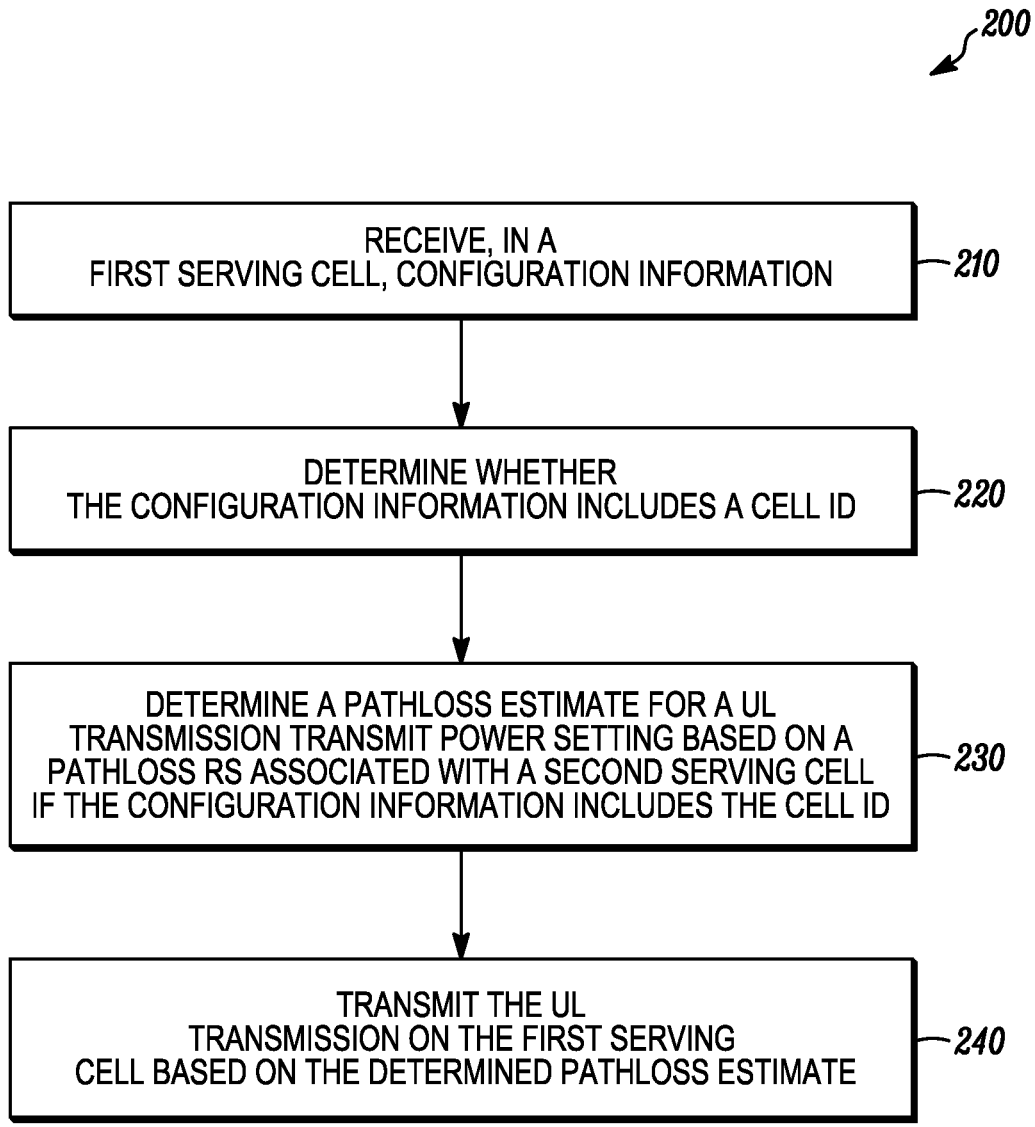
FIG. 2 is an example flowchart illustrating the operation of an apparatus according to a possible embodiment.

FIG. 2 is an example flowchart 200 illustrating the operation of a wireless communication device, such as the UE 110, according to a possible embodiment. At 210, configuration information can be received in a first serving cell.

At 220, a determination can be made as to whether the configuration information includes a cell ID. For example, a determination can be made as to whether the configuration information includes a cell ID indicating a second serving cell. According to a possible embodiment, the configuration information can include an identification of a pathloss RS.

The identification of the pathloss RS can be an identification for a RS configured as a PUCCH pathloss RS, such as an identification from a pucch-PathlossReferenceRS-Id information element. The identification of the pathloss RS can also be based on pathloss RS for SRS information. The identification of the pathloss RS can additionally be based on PUSCH pathloss RS information. The identification of the pathloss RS can further be, or be based on, any other identification of a pathloss RS.

At 230, a pathloss estimate for a UL transmission transmit power setting can be determined based on a pathloss RS associated with the second serving cell if the configuration information includes the cell ID. According to a possible embodiment, the pathloss RS can be received on the second serving cell. The second serving cell can be different from the first serving cell. For example, the second serving cell can be a primary serving cell, and the first serving cell can be a secondary serving cell.

According to a possible implementation, the pathloss estimate for a UL transmission transmit power setting can be determined based on the pathloss RS associated with a second serving cell by being conditioned on or otherwise based on the configuration information including the cell ID. At least some of the additional operations of the disclosed methods can also be based on/conditioned on the configuration information including the cell ID and/or a cell ID indicating a second serving cell.

According to a possible implementation, the pathloss estimate for the UL transmission transmit power setting can be determined based on the pathloss RS associated with the second serving cell if the configuration information includes the cell ID indicating the second serving cell. The configuration information can be included in a single resource, such as in an information element, in DCI, from higher layer signaling, or via any other resource for receiving configuration information. Also, and/or the configuration information can be included in one or multiple resources.

According to a possible implementation, the pathloss estimate can be determined based on a RS corresponding to the ID for the pathloss RS, such as pucch-PathlossReferenceRS-Id, pusch-PathlossReferenceRS-Id, or other ID for a pathloss RS, configured in the second serving cell with the cell ID. The RS can be an SSB, a CSI-RS, or other RS. According to another possible implementation, a pathloss estimate for the UL transmission transmit power setting can be determined based on a pathloss RS associated with the first serving cell if the configuration information does not include the cell ID. According to another possible implementation, the configuration information including the cell ID can correspond to a pathloss linking parameter indicating the pathloss estimate is estimated based on the pathloss RS associated with the second serving cell.

At 240, the UL transmission can be transmitted on the first serving cell based on the determined pathloss estimate. For example, the UL transmission can be transmitted based on a transmit power setting that is based on the determined pathloss estimate.

According to a possible embodiment, the configuration information can be spatial relation information configuring at least one PUCCH spatial relation. The at least one PUCCH spatial relation can be for a PUCCH resource and/or PUCCH transmission. The UL transmission can be a PUCCH. The pathloss estimate for a PUCCH transmit power setting can be determined based on a PUCCH pathloss RS associated with a second serving cell if the spatial relation information includes the cell ID.

According to a possible implementation, an indication in a MAC Control Element (MAC-CE) can be received at the UE. The indication can activate a PUCCH spatial relation of the at least one PUCCH spatial relation to use for PUCCH transmission from the first serving cell. For example, if PUCCH-SpatialRelationInfo is configured with more than one value, a MAC-CE command can activate one of the configured spatial relations and the corresponding power control parameter indices.

According to another possible implementation, the spatial relation information can include an indication of a spatial relation RS. BWP identification (BWP-Id) information can be received in the configuration information. A BWP-Id can indicate a BWP of the second serving cell in which the spatial relation RS is located. The spatial relation RS can be determined to be associated with the second serving cell if the spatial relation information includes the cell ID. The spatial relation RS can be associated with the second serving cell by being transmitted or received by the UE on the second serving cell. The cell ID can indicate the second serving cell in which the spatial relation RS is located. The PUCCH can be transmitted on the first serving cell further based on a same spatial domain filter as a spatial domain filter used for communication of the spatial relation RS on the second serving cell. The PUCCH can be transmitted on the first serving cell using the same spatial domain transmission filter by using the same beam as a beam used for communicating the spatial relation RS on the second serving cell. According to a possible implementation, the cell ID can also indicate a Normal or Non-supplementary Uplink (NUL)/Supplementary Uplink (SUL) carrier index in which the spatial relation RS is located.

According to a possible implementation, the spatial relation RS can be an SRS. The spatial relation RS can be communicated via transmission of the SRS on the second serving cell. The SRS can be transmitted from a UE to a base station.

According to another possible implementation, the spatial relation RS can be an SSB and/or a CSI-RS. Communication of the spatial relation RS can include reception of the SSB and/or the CSI-RS on the second serving cell.

According to a possible implementation, the spatial relation information can include at least one power control related parameter indicating the pathloss RS. The pathloss RS can be communicated on the second serving cell if the spatial relation information includes the cell ID. The PUCCH transmit power setting for transmitting the PUCCH on the first serving cell can be determined based on the determined pathloss estimate. The PUCCH can be transmitted on the first serving cell using the determined PUCCH transmit power setting.

According to a possible embodiment, the at least one power control related parameter can also include a target spectral density identifier for a PUCCH, such as a p0-PUCCH-Id configured in the second serving cell indicated by the cell ID. The at least one power control related parameter can also include an index of a closed power control loop associated with power control of the PUCCH, such as a closedLoopIndex. A target spectral density, such as Po, can be determined for the PUCCH transmit power setting based on the target spectral density identifier for the PUCCH, such as p0-PUCCH-Id, configured in the second serving cell indicated by the cell ID. The PUCCH transmit power setting can be determined on the first serving cell based on the determined pathloss estimate, the determined target spectral density, and a closed-loop value, such as from a closedLoopIndex power control field, corresponding to the index of the closed power control loop.

The target spectral density can be referred to as Po, but can also be referred to as P0, P_O, Po, and/or any other indication of a target spectral density. According to a possible implementation, the target spectral density can be considered received power per RB at a network entity, such as a, gNB, a TRP, a network controller, or other network entity from a UE. It can also be perceived as a normalized/density of interference a UE generates at the network entity, such as the gNB for reception of signals from other UEs by the network entity, such as the gNB.

According to a possible embodiment, the configuration information can include SRS resource set information. The UL transmission can be an SRS.

According to another possible embodiment, the UL transmission can be a PUSCH. SRI-PUSCH power control configuration mapping information can be received. The SRI-PUSCH power control configuration mapping information can map PUSCH power control parameters to each of at least two SRI values for an SRI field in a downlink control information for the UL transmission. According to a possible implementation, the SRI field can have at least one bit with two possible values of SRI. The SRI field can be in the DCI. The pathloss estimate for a PUSCH transmit power setting can be based on the cell ID and the received SRI-PUSCH power control configuration mapping information. The pathloss estimate for the PUSCH transmit power setting can also be based on an ID for the pathloss RS corresponding to a received SRI. The SRI can be received in an UL grant DCI. The received SRI can be based on the SRI-PUSCH power control configuration mapping information.

According to a possible implementation, the configuration information can include PUSCH power control parameters that can include an ID for a pathloss RS, such as SRI-PUSCH-PathlossReferenceRS-Id. The PUSCH power control parameters can also include, sri-P0-PUSCH-AlphaSetId, sri-PUSCH-closedLoopIndex, and/or other PUSCH power control parameters. PUSCH information can be received in multiple information elements. For example, power control parameters can be received in a PUSCH-PowerControl information element and a cell ID can be received in a ServingCellConfig information element.

According to a possible implementation, the PUSCH transmit power setting for transmitting the PUSCH on the first serving cell can be determined based on the determined pathloss estimate and based on the received SRI-PUSCH power control configuration mapping. The PUSCH can be transmitted based on the PUSCH transmit power setting.

According to a possible implementation, downlink control information can be received in a control channel. The control channel can be a PDCCH or other control channel. The downlink control information can include an SRI field. A PUSCH power control parameter for the UL transmission can be determined based on an SRI value of the SRI values indicated by the SRI field and SRI-PUSCH power control configuration mapping information. The pathloss estimate for a PUSCH transmit power setting can be based on the cell ID and the determined PUSCH power control parameter.

According to a possible implementation, the configuration information can include SRS resource set configuration information and spatial relation information for at least one SRS resource of the SRS resource set. The spatial relation information can include an indication of a spatial relation RS. Each SRI value of the SRI values can map to each of the at least one SRS resource in the SRS resource set. At least one SRS resource can be determined based on the SRI value indicated by the SRI field. The spatial relation RS in the spatial relation information of the determined at least one SRS resource can be determined to be associated with the second serving cell if the spatial relation information of the determined at least one SRS resource includes the cell ID. The PUSCH can be transmitted with the PUSCH transmit power setting on the first serving cell further based on a same spatial domain filter as a spatial domain filter used for communication of the spatial relation RS in the spatial relation information of the determined at least one SRS resource on the second serving cell.

According to a possible embodiment, spatial relation information can be received at a UE in a first serving cell. The spatial relation information can configure at least one SRS resource in an SRS resource set. The spatial relation information for the at least one SRS resource can include an indication of spatial relation RS and can include a cell ID indicating a second serving cell in which the spatial relation RS is located. SRI-PUSCH power control configuration mapping information can be received at the UE. The SRI-PUSCH power control configuration mapping information can map PUSCH power control parameters to each of the at least one SRS resource. The PUSCH power control parameters can include an ID for a pathloss RS, such as an SRI-PUSCH-PathlossReferenceRS-Id. An SRI indication can be received at the UE in an UL grant DCI. The SRI indication can indicate the at least one SRS resource. A pathloss estimate for a PUSCH transmit power setting can be determined based on the cell ID, based on the ID for the pathloss RS corresponding to the indicated SRI, and based on the received SRI-PUSCH power control configuration mapping information. According to a possible implementation, the pathloss estimate can be determined based on a reference signal corresponding to the ID for the pathloss RS configured in the second serving cell with the cell ID. The PUSCH transmit power setting for transmitting a PUSCH on the first serving cell can be determined based on the determined pathloss estimate and based on the received SRI-PUSCH power control configuration mapping. According to a possible implementation, the transmit power setting for PUSCH on the first serving cell can be further based on the determined open loop parameters and based on a closed-loop value associated to a sri-PUSCH-closedLoopIndex corresponding to the received SRI indication. The second serving cell can be a secondary serving cell configured with a pathloss linking parameter indicating the path loss estimate is estimated on the second serving cell. The PUSCH can be transmitted on the first serving cell using the determined transmit power setting for the PUSCH and using a same spatial domain transmission filter as a spatial domain transmission filter used for communication of the spatial relation RS in the at least one SRS resource indicated by the SRI on the second serving cell.

According to a possible implementation, open loop parameters can be determined for a PUSCH transmit power setting corresponding to a sri-P0-PUSCH-AlphaSetId configured in the second serving cell with the cell ID. The open loop parameters can include Po, alpha, and other open loop parameters.

According to a possible implementation, a MAC-CE indication can be received at the UE. The MAC-CE indication can activate the SRS resource set comprising the at least one SRS resource of a semi-persistent type. Also, information comprising the spatial relation information configuring the at least one SRS resource to use for PUSCH transmission from the first serving cell can be received at the UE. The SRI-PUSCH power control mapping information can include first SRI-PUSCH power control mapping information. The received MAC-CE indication can include second SRI-PUSCH power control mapping information that overwrites or is used in place of the first SRI-PUSCH power control configuration mapping information.

According to a possible implementation, the SRI indication in the UL grant DCI can indicate more than one SRS resource of the at least one SRS resource in the SRS resource set. The cell ID for at least one of the power control parameters, such as path loss, Po, and alpha, can be determined based on the cell ID field in a spatial relation information field spatialRelationInfo of a lowest index SRS-Resource, such as an SRS-Resource with the lowest value of srs-ResourceId. According to another possible embodiment, spatial relation information can be received at a UE in a first serving cell. The spatial relation information can configure at least one PUCCH spatial relation. The spatial relation information can include a cell ID indicating a second serving cell and at least one power control related parameter indicating a PUCCH pathloss RS. The PUCCH pathloss RS can be associated with the second serving cell. A pathloss estimate for a PUCCH transmit power setting can be determined based on the PUCCH pathloss RS. The transmit power setting for transmitting the PUCCH on the first serving cell can be determined based on the determined pathloss estimate. The PUCCH can be transmitted on the first serving cell using the determined transmit power setting for PUCCH.

According to another possible embodiment, spatial relation information can be received at the UE in a first serving cell. The spatial relation information can configure at least one PUCCH spatial relation. A determination can be made as to whether the spatial relation information includes a cell ID. A pathloss estimate for a PUCCH transmit power setting can be determined based on a PUCCH pathloss RS associated with a second serving cell if the spatial relation information includes the cell ID. The PUCCH can be transmitted on the first serving cell based on the determined pathloss estimate.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 3:
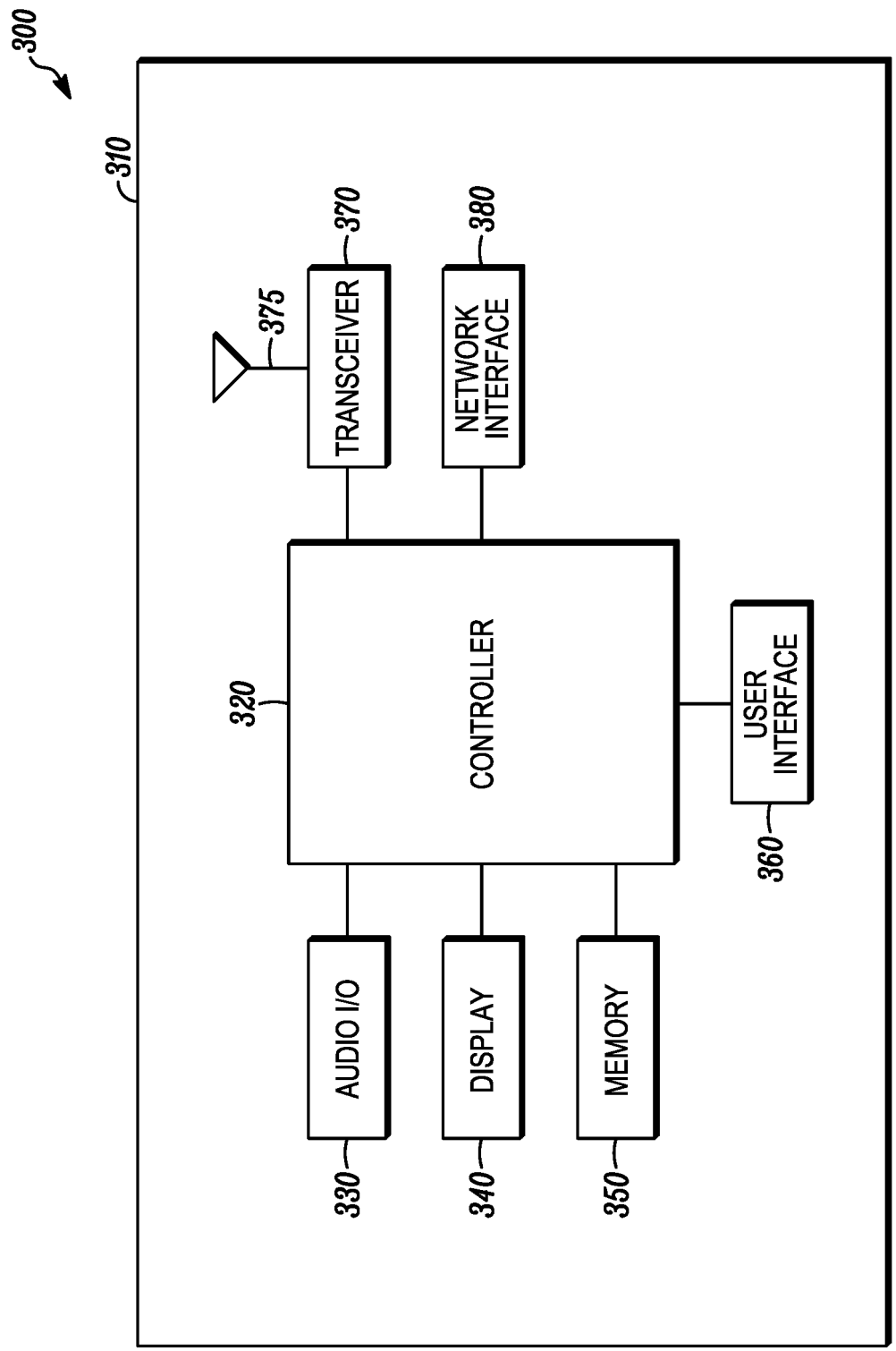
FIG. 3 is an example block diagram of an apparatus according to a possible embodiment.

FIG. 3 is an example block diagram of an apparatus 300, such as the UE 110, the network entity 120, or any other wireless communication device disclosed herein, according to a possible embodiment. The apparatus 300 can include a housing 310, a controller 320 coupled to the housing 310, audio input and output circuitry 330 coupled to the controller 320, a display 340 coupled to the controller 320, a memory 350 coupled to the controller 320, a user interface 360 coupled to the controller 320, a transceiver 370 coupled to the controller 320, at least one antenna 375 coupled to the transceiver 370, and a network interface 380 coupled to the controller 320. The apparatus 300 may not necessarily include all of the illustrated elements for different embodiments of the present disclosure. The apparatus 300 can perform the methods described in all the embodiments.

The display 340 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 370 can be one or more transceivers that can include a transmitter and/or a receiver. The audio input and output circuitry 330 can include a microphone, a speaker, a transducer, or any other audio input and output circuitry. The user interface 360 can include a keypad, a keyboard, buttons, a touch pad, a joystick, a touch screen display, another additional display, or any other device useful for providing an interface between a user and an electronic device. The network interface 380 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 350 can include a Random-Access Memory (RAM), a Read Only Memory (RON), an optical memory, a solid-state memory, a flash memory, a removable memory, a hard drive, a cache, or any other memory that can be coupled to an apparatus.

The apparatus 300 or the controller 320 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 350, elsewhere on the apparatus 300, in cloud storage, and/or anywhere else that can store software and/or an operating system. The apparatus 300 or the controller 320 may also use hardware to implement disclosed operations. For example, the controller 320 may be any programmable processor. Furthermore, the controller 320 may perform some or all of the disclosed operations. For example, some operations can be performed using cloud computing and the controller 320 may perform other operations. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 320 may be any controller or processor device or devices capable of operating an apparatus and implementing the disclosed embodiments. Some or all of the additional elements of the apparatus 300 can also perform some or all of the operations of the disclosed embodiments.

In operation, the apparatus 300 can perform the methods and operations of the disclosed embodiments. The transceiver 370 can transmit and receive signals, including control signals and data signals and including information, such as control and data information. The controller 320 can generate and process the transmitted and received signals and information.

According to a possible embodiment, the transceiver 370 can receive configuration information in a first serving cell. The controller 320 can determine whether the configuration information includes a cell ID. The controller 320 can determine a pathloss estimate for a UL transmission transmit power setting based on a pathloss RS associated with a second serving cell if the configuration information includes the cell ID. The transceiver 370 can transmit the UL transmission on the first serving cell based on the determined pathloss estimate.

According to a possible embodiment, the configuration information can include spatial relation information configuring at least one PUCCH spatial relation. The UL transmission can be a PUCCH. The controller 320 can determine the pathloss estimate for a PUCCH transmit power setting based on a PUCCH pathloss RS associated with a second serving cell if the spatial relation information includes the cell ID.

According to a possible embodiment, the UL transmission can be a PUSCH. The transceiver 370 can receive SRI-PUSCH power control configuration mapping information. The SRI-PUSCH power control configuration mapping information can map PUSCH power control parameters to each of at least two SRI values for an SRI field in a downlink control information for the UL transmission. The pathloss estimate for a PUSCH transmit power setting can be based on the cell ID and the received SRI-PUSCH power control configuration mapping information.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method in a user equipment, the method comprising:
receiving, at the user equipment, in a first serving cell, configuration information;
determining whether the configuration information includes a cell identifier;
determining a pathloss estimate for an uplink transmission transmit power setting based on a pathloss reference signal associated with a second serving cell if the configuration information includes the cell identifier; and
transmitting the uplink transmission on the first serving cell based on the determined pathloss estimate.

2. The method according to claim 1, wherein the second serving cell is different from the first serving cell.

3. The method according to claim 1, further comprising receiving the pathloss reference signal on the second serving cell.

4. The method according to claim 1, wherein the configuration information includes an identification of the pathloss reference signal.

5. The method according to claim 1,
wherein determining whether the configuration information includes the cell identifier comprises determining whether the configuration information includes a cell identifier indicating the second serving cell, and
wherein determining the pathloss estimate comprises determining the pathloss estimate for the uplink transmission transmit power setting based on the pathloss reference signal associated with the second serving cell if the configuration information includes the cell identifier indicating the second serving cell.

6. The method according to claim 1, further comprising determining a pathloss estimate for the uplink transmission transmit power setting based on a pathloss reference signal associated with the first serving cell if the configuration information does not include the cell identifier.

7. The method according to claim 1,
wherein the configuration information comprises spatial relation information configuring at least one physical uplink control channel spatial relation,
wherein the uplink transmission comprises a physical uplink control channel, and
wherein determining the pathloss estimate comprises determining the pathloss estimate for a physical uplink control channel transmit power setting based on a physical uplink control channel pathloss reference signal associated with the second serving cell if the spatial relation information includes the cell identifier.

8. The method according to claim 7,
wherein the spatial relation information includes an indication of a spatial relation reference signal,
wherein the method further comprises determining the spatial relation reference signal is associated with the second serving cell if the spatial relation information includes the cell identifier, and
wherein the physical uplink control channel is transmitted on the first serving cell further based on a same spatial domain filter as a spatial domain filter used for communication of the spatial relation reference signal on the second serving cell.

9. The method according to claim 8,
wherein the spatial relation reference signal comprises a sounding reference signal, and
wherein communication of the spatial relation reference signal comprises transmission of the sounding reference signal on the second serving cell.

10. The method according to claim 8,
wherein the spatial relation reference signal comprises at least one selected from a synchronization signal/physical broadcast channel block and a channel state information-reference signal, and
wherein communication of the spatial relation reference signal comprises reception of the at least one selected from the synchronization signal/physical broadcast channel block and the channel state information-reference signal on the second serving cell.

11. The method according to claim 7,
wherein the spatial relation information includes at least one power control related parameter indicating the pathloss reference signal,
wherein the pathloss reference signal is communicated on the second serving cell if the spatial relation information includes the cell identifier,
wherein the method further comprises determining the physical uplink control channel transmit power setting for transmitting the physical uplink control channel on the first serving cell based on the determined pathloss estimate, and
wherein transmitting the physical uplink control channel comprises transmitting the physical uplink control channel on the first serving cell using the determined physical uplink control channel transmit power setting.

12. The method according to claim 1,
wherein the configuration information comprises sounding reference signal resource set information, and
wherein the uplink transmission comprises a sounding reference signal.

13. The method according to claim 1,
wherein the uplink transmission comprises a physical uplink shared channel,
wherein the method further comprises receiving, at the user equipment, sounding reference signal resource indicator-physical uplink shared channel power control configuration mapping information, where the sounding reference signal resource indicator-physical uplink shared channel power control configuration mapping information maps physical uplink shared channel power control parameters to each of at least two sounding reference signal resource indicator values for an sounding reference signal resource indicator field in a downlink control information for the uplink transmission, and
wherein the pathloss estimate for the physical uplink shared channel transmit power setting is based on the cell identifier and the received sounding reference signal resource indicator-physical uplink shared channel power control configuration mapping information.

14. The method according to claim 13, further comprising determining the physical uplink shared channel transmit power setting for transmitting the physical uplink shared channel on the first serving cell based on the determined pathloss estimate and based on the received sounding reference signal resource indicator-physical uplink shared channel power control configuration mapping, wherein the physical uplink shared channel is transmitted based on the physical uplink shared channel transmit power setting.

15. The method according to claim 13, further comprising:
receiving downlink control information in a control channel, the downlink control information including a sounding reference signal resource indicator field; and
determining a physical uplink shared channel power control parameter for the uplink transmission based on a sounding reference signal resource indicator value of the sounding reference signal resource indicator values indicated by the sounding reference signal resource indicator field and sounding reference signal resource indicator-physical uplink shared channel power control configuration mapping information,
wherein the pathloss estimate for the physical uplink shared channel transmit power setting is based on the cell identifier and the determined physical uplink shared channel power control parameter.

16. The method according to claim 15,
wherein the configuration information comprises sounding reference signal resource set configuration information and spatial relation information for at least one sounding reference signal resource of the sounding reference signal resource set,
wherein the spatial relation information includes an indication of a spatial relation reference signal,
wherein each sounding reference signal resource indicator value of the sounding reference signal resource indicator values maps to each of the at least one sounding reference signal resource in the sounding reference signal resource set,
wherein the method further comprises:
determining at least one sounding reference signal resource based on the sounding reference signal resource indicator value indicated by the sounding reference signal resource indicator field; and
determining the spatial relation reference signal in the spatial relation information of the determined at least one sounding reference signal resource is associated with the second serving cell if the spatial relation information of the determined at least one sounding reference signal resource includes the cell identifier, and
wherein the physical uplink shared channel is transmitted with the physical uplink shared channel transmit power setting on the first serving cell further based on a same spatial domain filter as a spatial domain filter used for communication of the spatial relation reference signal in the spatial relation information of the determined at least one sounding reference signal resource on the second serving cell.

17. The method according to claim 1, wherein the configuration information including the cell identifier corresponds to a pathloss linking parameter indicating the pathloss estimate is estimated based on the pathloss reference signal associated with the second serving cell.

18. An apparatus comprising:
a transceiver that receives, in a first serving cell, configuration information; and
a controller coupled to the transceiver, where the controller
determines whether the configuration information includes a cell identifier, and
determines a pathloss estimate for a uplink transmission transmit power setting based on a pathloss reference signal associated with a second serving cell if the configuration information includes the cell identifier,
wherein the transceiver transmits the uplink transmission on the first serving cell based on the determined pathloss estimate.

19. The apparatus according to claim 18,
wherein the configuration information comprises spatial relation information configuring at least one physical uplink control channel spatial relation,
wherein the uplink transmission comprises a physical uplink control channel, and
where the controller determines the pathloss estimate for a physical uplink control channel transmit power setting based on a physical uplink control channel pathloss reference signal associated with the second serving cell if the spatial relation information includes the cell identifier.

20. The apparatus according to claim 18,
wherein the uplink transmission comprises a physical uplink shared channel,
wherein the transceiver receives sounding reference signal resource indicator-physical uplink shared channel power control configuration mapping information, where the sounding reference signal resource indicator-physical uplink shared channel power control configuration mapping information maps physical uplink shared channel power control parameters to each of at least two sounding reference signal resource indicator values for a sounding reference signal resource indicator field in a downlink control information for the uplink transmission, and
wherein the pathloss estimate for the physical uplink shared channel transmit power setting is based on the cell identifier and the received sounding reference signal resource indicator-physical uplink shared channel power control configuration mapping information.

21. The apparatus according to claim 18, wherein the second serving cell is different from the first serving cell.

* * * * *